(12) United States Patent
Jordan et al.

(10) Patent No.: US 11,757,139 B2
(45) Date of Patent: Sep. 12, 2023

(54) BATTERY ELECTRODE INSPECTION SYSTEM

(71) Applicant: VOLKSWAGEN AKTIENGESELLSCHAFT, Wolfsburg (DE)

(72) Inventors: Marco Jordan, Salzgitter (DE); Alexander Tornow, Ummern (DE)

(73) Assignee: VOLKSWAGEN AKTIENGESELLSCHAFT, Wolfsburg (DE)

(*) Notice: Subject to any disclaimer, the term of this patent is extended or adjusted under 35 U.S.C. 154(b) by 13 days.

(21) Appl. No.: 17/178,919

(22) Filed: Feb. 18, 2021

(65) Prior Publication Data

US 2021/0265673 A1 Aug. 26, 2021

(30) Foreign Application Priority Data

Feb. 21, 2020 (DE) ...................... 10 2020 104 668.5

(51) Int. Cl.
*H01M 10/42* (2006.01)
*G01N 21/95* (2006.01)
*H01M 10/48* (2006.01)

(52) U.S. Cl.
CPC ........ *H01M 10/4285* (2013.01); *G01N 21/95* (2013.01); *H01M 10/48* (2013.01)

(58) Field of Classification Search
CPC ... H01M 10/4285; H01M 10/48; G01N 21/95
See application file for complete search history.

(56) References Cited

U.S. PATENT DOCUMENTS

| 9,379,418 | B2* | 6/2016 | Wang ............... | H01M 10/0431 |
| 10,026,999 | B2 | 7/2018 | Teruyuki et al. | |
| 11,251,469 | B2 | 2/2022 | Nyeon et al. | |
| 11,307,026 | B2 | 4/2022 | Jin et al. | |
| 2005/0122664 | A1* | 6/2005 | Takahashi ......... | H01M 10/0525 |
| | | | | 361/530 |

(Continued)

FOREIGN PATENT DOCUMENTS

CN 109952678 A 6/2019
DE 10 2013 221 592 A1 5/2015

(Continued)

OTHER PUBLICATIONS

Search report for German Patent Application No. 10 2020 104 668.5, dated Nov. 9, 2020.

(Continued)

*Primary Examiner* — Raymond L Nimox
(74) *Attorney, Agent, or Firm* — PEARL COHEN ZEDEK LATZER BARATZ LLP

(57) ABSTRACT

The present invention relates to a method for inspection of a multilayer electrode sheet for a battery cell, comprising at least the following steps: joining together at least two functional layers; connecting the functional layers to form an electrode-separator assembly; detecting at least part of a surface of the electrode-separator assembly by means of a detection device for generating a measurement result; evaluating the generated measurement result and generating an evaluation result; and outputting the evaluation result.

10 Claims, 4 Drawing Sheets

(56) References Cited

U.S. PATENT DOCUMENTS

| | | | | |
|---|---|---|---|---|
| 2008/0274394 A1* | 11/2008 | Schormann | ........... | H01M 10/02 |
| | | | | 156/60 |
| 2010/0015529 A1* | 1/2010 | Kim | ................. | H01M 10/0413 |
| | | | | 429/246 |
| 2011/0052964 A1* | 3/2011 | Kim | ................. | H01M 10/0459 |
| | | | | 429/152 |
| 2014/0004389 A1* | 1/2014 | Schaefer | ........... | H01M 10/4207 |
| | | | | 429/61 |
| 2017/0162845 A1* | 6/2017 | Gansemer | ............... | B60L 50/64 |
| 2018/0254453 A1 | 9/2018 | Chikae et al. | | |
| 2020/0370882 A1* | 11/2020 | Jung | ...................... | G01N 21/88 |
| 2022/0314596 A1 | 10/2022 | Yamada et al. | | |

FOREIGN PATENT DOCUMENTS

| | | | |
|---|---|---|---|
| EP | 3 627 143 A1 | 3/2020 | |
| JP | 5311221 B2 | 10/2013 | |
| JP | 2015-176699 A | 10/2015 | |
| JP | 2015176699 A | * 10/2015 | |
| JP | 2018147684 A | 9/2018 | |
| JP | 2020016652 A | 1/2020 | |
| WO | WO 2015/058843 A1 | 4/2015 | |
| WO | WO 2015/087631 A1 | 6/2015 | |
| WO | WO 2016/026782 A1 | 2/2016 | |
| WO | WO 2019/190129 A1 | 10/2019 | |

OTHER PUBLICATIONS

Office Action for Chinese Patent Application 202110188637.8, dated Oct. 9, 2022.

Search Report for Chinese Patent Application No. 202110188637.8, dated May 24, 2023.

* cited by examiner

BATTERY ELECTRODE INSPECTION SYSTEM

CROSS REFERENCE TO RELATED APPLICATION

This application claims priority from German Patent Application No. 10 2020 104 668.5, filed Feb. 21, 2020, which is incorporated by reference in its entirety.

FIELD OF THE INVENTION

The present invention relates to a method for inspection of a multilayer electrode-separator assembly for a battery cell and to a device for inspection of the electrode-separator assembly and a battery cell.

BACKGROUND OF THE INVENTION

Lithium-ion batteries are increasingly seen as a key technology in modern technology. Therefore, they are subject to continuous further development of different aspects, such as production costs, achievable energy density, service life, safety and/or charging time, to name only a few examples.

Batteries for storing larger amounts of energy, such as traction batteries in vehicles, generally consist of a plurality of battery cells, which in turn are composed of a plurality of cell components. Cell components of battery cells are electrodes, separator layers, current collector layers or current collectors, layers of active material on the electrodes, electrolytes and surrounding housings or foils.

The lithium-ion batteries or the battery cells constructed according to this principle basically have two electrodes. On the one hand, there is a negative electrode called the anode and, on the other hand, a positive electrode called the cathode.

The electrodes usually consist of current collectors and active material. In each case an active material appropriate for the polarity is arranged on the electrode sheet. A different active material is used on the anode than on the cathode. At least one separator layer, which prevents an electrical short circuit between the electrodes, is also provided between two electrodes of different polarity. At the same time, however, the separator layer is permeable to certain ions, such as lithium ions, so that these ions can pass through the separator layer while the battery is being charged or discharged.

For the battery cells to function, an ion-conducting electrolyte is also required, which wets the active layers of the electrodes and the separator layer in such a way that it acts as a mediator for the processes in the cell. The terms anode and cathode are defined using the oxidation or reduction process. Which of the two electrodes is oxidized or reduced depends on whether the battery cells are being charged or discharged. When considering batteries or battery cells, however, it has become common practice to always use the discharge process as a definition for the terms anode and cathode.

The negative electrode of the battery cells often consists of a copper foil and a layer of graphite or lithium-alloyed material as the electrochemical active material. The positively charged lithium ions required for the provision of power are stored in the negative electrode during charging (intercalation). Graphite anodes are currently the most common choice because they have a low electrode potential and a low volume expansion during the storage of lithium ions. The positive electrode often consists of mixed oxides that are applied to an aluminum collector. The positive electrode with the active material assigned to it serves as a lithium source during charging of the cell.

Known lithium-ion batteries are generally composed of a large number of electrode sheets which are arranged one above the other in a battery cell. In the production of battery cells, it is therefore advantageous first of all to interconnect a plurality of the required layers having the desired layer structure to form electrode sheets in order then to produce battery cells, also called cell stacks, from the prefabricated electrode sheets in a further manufacturing step.

For example, during a lamination process, individual components of the battery cells, such as the anode, the separator layer and the cathode, are firmly connected to one another so that their position and orientation are fixed relative to one another. This creates a so-called multilayer electrode sheet, which is referred to below as an electrode-separator assembly (ESA). Particularly in the case of large-format battery cells, such as so-called pouch cells, lamination is an advantageous method both to increase the process speed in the manufacturing process and to improve the cell performance in the later end product. The invention is not necessarily limited to a monocell assembly (anode, separator, cathode, separator); it can also be used for individual laminated electrode sheets (e.g. separator, anode, separator).

However, the lamination process is a very complex production process. Extremely sensitive materials have to be processed. The processing of separator layers is particularly critical because they are extremely sensitive to the pressure and temperature loads prevailing in the process. The challenge during the process is to achieve an optimal connection between the layered cell components without confirming the cell components.

All previously known methods for connecting the layers require a relatively complex process management. Random checks must be carried out regularly to ensure that the various layers have been reliably connected to one another.

The solutions known up to now, therefore, have the disadvantage that they are complex and are suitable only to a limited extent for large-scale manufacture. In addition, defective production processes can remain undetected for a relatively long time until the next sample is taken and evaluated.

SUMMARY OF THE INVENTION

The object of the present invention is therefore to at least partially solve the problems arising from the prior art. In particular, a method for inspection of laminated electrode-separator assemblies and batteries with electrode-separator assemblies is specified which is suitable for large-scale manufacture and ensures inspection of the safe and reliable connection of the layers to one another.

To achieve these objects, methods and devices with the features according to the independent claims are proposed. Advantageous further developments are the subject matter of the dependent claims. The features listed individually in the claims can be combined with one another in a technologically sensible manner and can be supplemented by explanatory facts from the description and/or details from the figures, further embodiment variants of the invention being shown.

The proposed method for inspection of a multilayer electrode-separator assembly for a battery cell comprises at least the following steps:

a) joining together at least two functional layers;
b) connecting the functional layers to form a multilayer electrode-separator assembly;
c) detecting at least part of a surface of the electrode-separator assembly by means of a detection device for generating a measurement result;
d) evaluating the generated measurement result and generating an evaluation result;
e) outputting the evaluation results (in particular for manual or machine processing).

The method designed in this way enables seamless and timely process monitoring of the production process.

For this purpose, in a first step a), at least two functional layers can initially be arranged relative to one another, wherein a predetermined positioning and orientation of the two functional layers is maintained.

"Functional layers" in this context are cell components that are necessary for the battery cell to function, such as layered or plate-shaped cathodes, anodes and separators.

"Joining together" is understood here in particular to mean how the functional layers are joined relative to one another. The functional layers should overlap one another and should be correctly oriented with respect to one another in order to be (permanently) connected to one another in this position.

The "orientation" of the functional layers relates to the use of functional layers that have a specific orientation direction. The orientation can optionally be the alignment along, for example, the width, length or height of the functional layer. Thus, for example, it is possible to use functional layers of which the strength/resilience is higher in a first direction than in a second direction transverse thereto. Furthermore, functional layers can also be used which are oriented in the direction of the height of the functional layer. For example, layered electrodes can be used which are specially prepared on one side for contact with a corresponding active material. These electrodes should then be arranged so that they are oriented in such a way that this prepared surface comes into contact with the associated active material during the joining together.

In the following or subsequent step b), the functional layers thus positioned with respect to one another are connected to form an electrode-separator assembly.

An "electrode-separator assembly" can thus be understood as a "permanent" assembly of at least some of the functional layers joined together in step a). The assembly takes place in particular over a large area over the length and width of the relevant functional layer. The electrode-separator assembly can optionally be produced from functional layers of a predetermined length or from endless strips of functional layers which are joined and connected to one another with the desired layer structure. When endless strip-shaped functional layers are used, endless electrode-separator assemblies can be produced from which the multilayer electrode sheets or electrode-separator assemblies with a defined length can then be manufactured by cutting to length. Alternatively, the functional layers can first be individually cut to the desired length and can then be connected to one another.

Afterwards or subsequently, in a step c) for quality assurance, the connection created between the functional layers is checked. For this purpose, at least part of the surface of the electrode-separator assembly is first detected by means of a detection device in order to generate a measurement result from it.

A "surface" is understood here to mean one (of the two) outer surface(s) of the electrode-separator assembly which is oriented parallel to the joining plane or parallel to the functional layers. A substantial part of the surface is preferably covered, for example with an area in the range from 1 to 1000 $cm^2$ or from 1 to 100% of the surface in contact.

The "detection device" is particularly suitable for detecting the surface topography, surface temperature and/or surface color. This can take place by means of an optical sensor, a photographic apparatus and/or a camera.

It is possible for the "detection device" to comprise at least one lighting unit which can emit light onto the surface of the electrode-separator assembly to be detected.

The detection device can generate and pass on electronic data and/or electrical signals as a measurement result. The measurement result can be (temporarily) saved or passed on directly.

This measurement result is then evaluated in the subsequent step d) in order to generate an evaluation result therefrom.

The "evaluation" can include a comparison, a change, and an analysis of the measurement result on the basis of predetermined characteristic values, functions and/or calculation routines. This can include processing of the electronic data and/or electrical signals. It is also possible to include image processing and/or image analysis. The evaluation result can be (temporarily) saved or passed on directly.

This evaluation result is then output in the final step e) in order to be further processed.

In particular, the evaluation result is transferred to a higher-level control unit or display unit (outside the detection device). The output is preferably carried out in such a way that it can result directly or automatically in a display and/or an adaptation of the production process.

Steps c) to e) make it possible to continuously monitor the production process and to produce consistently high quality through the immediate real-time detection of defective electrode-separator assemblies. In this context, real-time detection means that defective electrode-separator assemblies are detected within only a few milliseconds and that the corresponding evaluation results can be immediately initiated to eliminate the defect. These measures can consist, for example, in identifying the defective electrode-separator assemblies as defective and removing them from the production process. Another measure can consist in changing the parameters selected in the selected connection process of the functional layers in step b). If, for example, lamination is used in the connection process, the pressure and/or temperature can be adjusted as parameters.

In particular, it is proposed for further development that at least one electrode is joined together with an active material layer and at least one separator layer in step a). Here, the electrode consists, for example, of an electrically conductive substrate and a layer of active material applied thereto. In an advantageous development of the invention, it may also be provided that the electrode is first manufactured individually or simultaneously during the manufacture of the electrode-separator assembly by connecting at least one substrate layer and one active material layer as functional layers.

Another development may for example provide that an anode and a cathode and two separators are connected to one another at the same time in one production step. This would correspond to a four-layer structure of the electrode-separator assembly.

In principle, it is possible to produce the electrode-separator assembly in the most varied configurations. For example, the electrode-separator assembly can have a two-layer, three-layer or multilayer structure. In addition, a current collector, as a so-called collector tab, can also be included or laminated directly as part of the layer structure of the functional layers.

Electrode collectors are provided to protrude from the cell stack in order in this way to deliver the generated current to an electrical consumer located outside the cell stack. Inside, electrodes are provided to conduct a generated current directly or via current collectors to the respective associated electrode collectors of the same polarity. Copper foils which are in contact with a graphite coating which has a low electrode potential can be used, for example, on the anode side as the substrate foil. On the cathode side, the substrate foils can be designed, for example, as aluminum collectors to which a mixed oxide is applied. The graphite anode can be used as the first active material and the mixed oxide can be used as the second active material. If a large number of electrode sheets are now arranged within a battery cell, the battery cell can have a positive and a negative electrode collector and the other electrode-separator assemblies can be connected to the relevant positive or negative electrode collector via collector tabs. In the case of a multilayer structure of the electrode-separator assembly, corresponding separator layers are to be provided which reliably prevent electrical contact between the electrode-separator assemblies of different polarity.

In particular, it is advantageous if the functional layers are connected to one another (over a large area) by means of a lamination process, adhesive process or welding process. These processes can be implemented extremely cost-effectively and reliably in industrial large-scale manufacture. The lamination process, in particular, can be precisely tailored to the respective requirements via the parameters of time, pressure and temperature.

It is particularly advantageous if steps a) to e) are carried out one after the other in a continuous process. This allows the advantages of the high manufacturing speed of continuous manufacture to be combined with continuous supply of the functional layers and continuous quality monitoring. Continuous within the meaning of the invention includes both continuous processes of feeding the functional layers with a constant feeding speed, and also those continuous processes in which the functional layers or sections of functional layers are fed with a constant cycle rate. The same applies to the removal speed or cycle rate of the removal of the inspected finished electrode-separator assemblies. In particular, prefabricated electrode-separator assemblies can also be fed to the inspection, in which case the step of connecting the functional layers can be omitted.

Immediately after the functional layers have been connected, the detection device can detect at least part of the surface of the manufactured electrode-separator assembly and can then generate a measurement result which can be evaluated by machine and which generates an evaluation result during this evaluation. This evaluation result is then output continuously, so that a human operator or a connected automated machine control can carry out an action to eliminate defects in accordance with the evaluation result.

As soon as the evaluation result indicates, for example, that the connection of the functional layers to one another no longer meets the predetermined requirements, production can be stopped and the defective sections of the electrode-separator assembly can be removed. As already mentioned above, this can be done manually by an operator or can be performed automatically by a machine control. Depending on the selected detection device, the surface of the electrode-separator assembly produced can be detected completely, i.e. on both sides, or only partially, i.e., for example, on one side. In addition to the one-sided detection of the surface of the electrode-separator assembly, it is possible that only certain partial areas of the electrode-separator assembly are detected by the detection device. In certain applications, it may be sufficient to monitor partial areas of the electrode-separator assembly during the detection, instead of the entire area or the entire width of the electrode-separator assembly.

In particular, it may be provided that the surface is detected by means of an optical camera system. With a camera system, it is particularly easy to monitor one side of the manufactured electrode-separator assembly if the camera system is stationary and the electrode-separator assembly is moved through the detection area of the camera system in a continuous process. As an alternative to the imaging method using a camera system, the detection can be carried out with other systems, such as systems that work with visible or invisible light, radar, laser or ultrasound, in order to check the quality of the connection between the functional layers.

It is particularly advantageous if the evaluation of the measurement result is carried out by means of an electronic data processing system which is configured for image processing, preferably for gray scale value determination and/or creation of a gray scale value histogram. Such a data processing system can, for example, evaluate the measurement result generated by the camera system. In the case of a camera system, the measurement results are individual images or a continuously changing sequence of images that are passed on to the data processing system for evaluation. Within the data processing system, the evaluation takes place according to predetermined rules.

In particular, it is provided that an associated characteristic value and in particular a gray scale value is determined when the measurement result is evaluated. This ACTUAL characteristic value is then compared with a predetermined TARGET characteristic value in the context of evaluating the measurement result, the evaluation result being determined by comparing the ACTUAL characteristic value and the TARGET characteristic value. For this purpose, it may be specified, for example, that an ACTUAL characteristic value that is greater than or equal to a predetermined TARGET characteristic value is accepted, while an ACTUAL characteristic value that is less than the predefined TARGET characteristic value is not accepted. If the ACTUAL characteristic value is not accepted, the considered section of the electrode-separator assembly does not meet the quality requirements.

It has proven to be particularly advantageous if the measurement result provided (by the camera system) is subjected to an evaluation of the gray scale values. It can be observed that there is a correlation between the gray scale value of the surface of the electrode-separator assembly and the quality of the connection between the functional layers. In principle, this correlation can be written in such a way that the better the adhesive bond is between the functional layers, the higher the gray scale value of the measurement result generated by the camera system will be. In turn, the higher the gray scale value is, the darker the gray shades will be on the corresponding measurement result or image of the detection system. However, there is a maximum above which there is no longer any increase in adhesive strength. From this point on, there is even a decrease in adhesive strength. The gray scale value formation of the recorded images is carried out with an image processing program. A gray scale value histogram is created, which indicates how many pixels in an image have a certain gray scale value. A mean value is then formed from these values, which is used to compare the samples. From the recorded image of the camera system, with the aid of the function an area is selected that is to be integrated into the gray scale value formation. As a result, the gray scale value is not only determined locally, but a large-area integral is determined, from which the mean value is then formed. It should be noted here that the determined gray scale values only represent relative gray scale values. To determine the exact gray scale values, the image processing system used can be calibrated beforehand with a gray scale.

In order to obtain measurement results that are as constant as possible, it is advantageous if step c) is carried out under constant and defined lighting conditions. This can be achieved, for example, by illuminating the area of the electrode-separator assembly to be detected with an artificial light source and shielding it from the influence of external light sources, such as daylight, for example by a shield. For this purpose, the camera system is ideally arranged together with a lighting unit within a housing. In this way, the reliability of the evaluation result can be significantly increased.

The object is also achieved by a device for inspection of a multilayer electrode-separator assembly for a battery cell, which is equipped with a feed device for at least two functional layers for an electrode-separator assembly, wherein a detection device for detecting at least part of the surface of the electrode-separator assembly is provided, which generates a measurement result corresponding to the detection and which has an evaluation device for evaluating the measurement result, which device outputs an evaluation result after the evaluation has taken place.

The device is set up in particular to carry out the method proposed here.

In particular, a device with at least one detection device and means is proposed, these being suitable for carrying out the steps a) to d) explained here. Furthermore, a computer program [product] is proposed, comprising commands which cause this device to carry out the steps a) to d). A computer-readable medium is also proposed on which this computer program [product] is stored.

By means of the device designed in this way, the inspection of the manufactured electrode-separator assembly can be carried out continuously and at high speeds, wherein complete process monitoring in real time, a so-called in-line inspection, is implemented.

This makes it possible to significantly increase productivity, since interruptions for quality assurance and for carrying out measurements are no longer necessary. At the same time, the reject rate can be significantly reduced, since defective connections between the functional layers are recognized immediately and briefly after manufacture has taken place. If defects occur in the connections in the electrode-separator assembly, only extremely small lengths of defective electrode-separator assemblies are produced before a user or a machine control can stop the system or take measures to eliminate the fault after the evaluation result has been output.

The present invention also proposes a battery cell, in particular a lithium-ion cell, which has at least two electrodes each having at least one electrode-separator assembly. The electrode-separator assemblies of the different electrodes have an at least two-layer structure, are produced according to the claimed method and are separated from one another by at least one separator layer. The battery cell produced and obtained in this way is particularly cost-effective to manufacture and has excellent electrical properties.

As a precaution, it should be noted that the numerals used here ("first," "second," . . . ) serve primarily (only) to differentiate between a plurality of similar objects, sizes or processes, and in particular, therefore, do not necessarily prescribe any dependency and/or sequence of these objects, sizes or processes relative to one another. Should a dependency and/or sequence be necessary, this is explicitly stated here or it is evident for the person skilled in the art to study the specifically described configuration.

BRIEF DESCRIPTION OF THE DRAWINGS

The invention and the technical environment are explained in more detail below with reference to the accompanying figures. It should be pointed out that the invention is not intended to be limited by the exemplary embodiments mentioned. In particular, unless explicitly stated otherwise, it is also possible to extract partial aspects of the facts explained in the figures and to combine them with other components and findings from the present description. In particular, it should be pointed out that the figures and in particular the proportions shown are only schematic. in which:

In FIG. 1, a device 1 for performing the method explained here is shown in a schematic side view.

DETAILED DESCRIPTION OF THE INVENTION

Figure 1:
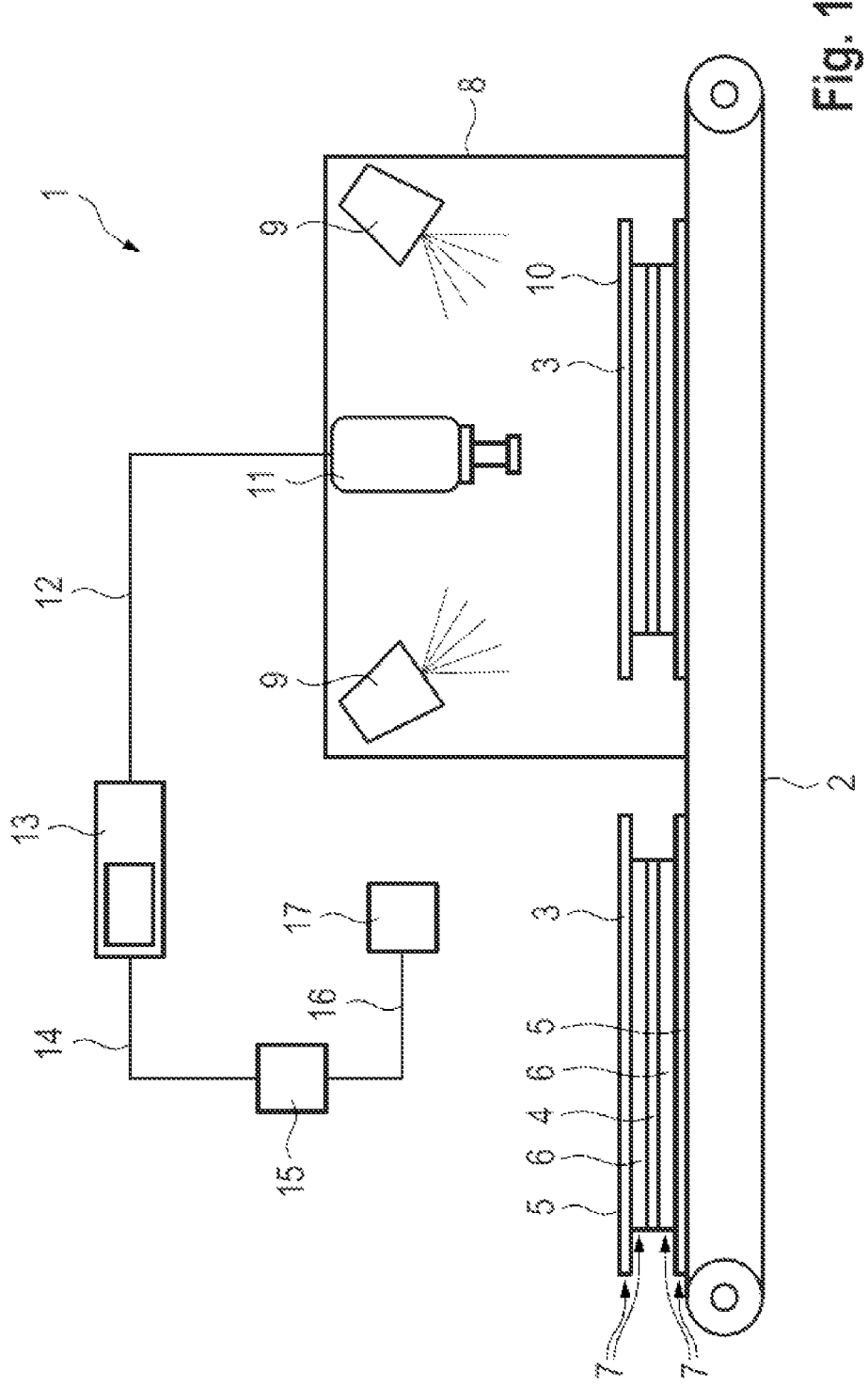
FIG. 1: is a schematic representation of a device for inspection of an electrode-separator assembly.

By means of a feed device 2, an already laminated electrode-separator assembly 3 is fed in from the left.

In the embodiment shown, the electrode-separator assembly 3 has an electrode 4 and two separator layers 5. Active material layers 6 are also located between the electrode 4 and the separator layers 5. In the state shown, the functional layers 7 consisting of the electrode 4 with the active material layers 6 and the two separator layers 5 are already connected to one another by lamination. The lamination joins the electrode 4 and the active materials 6 located thereon to the separator 5. The process steps a) and b) of the process have already been carried out.

In the next step, at least part of the surface of the laminated electrode-separator assembly 3 is detected. For this purpose, the electrode-separator assembly 3 is moved into a housing 8. The housing 8 shields the electrode-separator assembly 3 located therein from external light influences. In order to achieve constant lighting conditions within the housing 8, a dedicated lighting system 9 is provided therein, which illuminates the electrode-separator assembly 3 optimally and in a constant manner.

In the embodiment shown, a surface 10 of the electrode-separator assembly 3 is recorded by means of a camera system 11. In other words, only a partial area of the surface 10 of the electrode-separator assembly 3 is detected, namely the upper side, while the lower side is not detected. Alternatively or additionally, the electrode-separator assembly could also be examined and inspected on the lower side through an opening (window) in the conveyor system or an inverted vacuum belt. The measurement result captured by the camera system 11 is passed on in the form of an image via a signal line 12 to an electronic data processing device 13.

Alternatively, the inspection can also be carried out by continuously transmitting images and measured values in a rapid time sequence and can provide a measurement result in the form of a measured value sequence or video sequence.

Image processing then takes place in the data processing device 13 in the form of a gray scale value determination. In the determination of the gray scale value, a gray scale value is determined for the image provided by the camera system 11. This gray scale value can be determined for the entire image or for parts of the image. After at least one gray scale value has been determined, this determined ACTUAL gray scale value is compared with a predefined target gray scale value. In a certain range of the gray scale values, the better the connection is between the functional layers 7, the higher the determined ACTUAL gray scale value will be which is determined by the data processing device 13 for the generated image. This makes use of the fact that the better the adhesive connection is between the functional layers 7, the darker the image will be and consequently the higher the gray scale value will be, until it finally reaches a maximum. If the gray scale value increases beyond that, the adhesive strength can decrease again. Thus, if a determined ACTUAL gray scale value is exactly at or above the predetermined TARGET gray scale value, the connection between the functional layers 7 has been produced correctly. If, on the other hand, gray scale values which are below the TARGET gray scale value are determined in the electrode-separator assemblies to be monitored, then the connections between the functional layers 7 are incorrect and the corresponding length of the electrode-separator assembly 3 is defective and should be disposed of as a reject. The result of this comparison between the determined ACTUAL gray scale value and the specified TARGET gray scale value is then output as an evaluation result. This can take place, for example, by means of a second signal line 14 to a PLC controller 15 and further via a third signal line 16 to a server 17. The server 17 can either be operated locally or can be designed as a so-called cloud solution.

With the device described, the functional layers or cell components, such as anodes, separator layers or cathodes, can be firmly connected to one another, and can be arranged so that they are positioned and oriented very precisely with respect to one another. A so-called electrode-separator assembly is created by the connection of the functional layers or cell components. This can be used in particular with large-format battery cells. Such battery cells will be required in large numbers in the future, which is why the manufacture thereof at high process speeds is of particular advantage in order to reduce costs and to achieve the required quality.

Furthermore, the performance values of battery cells that are manufactured as suggested here can also be improved. This then also improves the properties of the finished batteries in which battery cells with such electrode-separator assemblies are included.

The sometimes very sensitive materials that have to be processed in the production of battery cells can be processed safely and quickly with the present method and the present device, and at the same time the undesirable manufacture of large quantities of defective electrode-separator assemblies is avoided. For this purpose, the in-line inspection that is provided is used to determine the quality of the connection between the functional layers. In contrast to the methods previously known in the prior art, the ongoing manufacturing process no longer has to be analyzed using individual samples, but continuous analysis can take place in real time. Thus, possible deficits in the production process are discovered immediately and not only after the product has been completed. This can reduce the production costs and can significantly improve the efficiency of the production process. Use is made of the knowledge that investigations have recognized a correlation between the surface brightness or the gray scale value of the laminated electrode-separator assemblies and the lamination parameters such as pressure and temperature used in the manufacturing process. As the compression rate increases, the gray scale value also increases. Thus, samples of electrode-separator assemblies, which may also be designated simply as laminates and are exposed to higher compression, appear "darker" because, for example, the surface of the cathode shows through the separator layer to a greater extent. The same applies to changes in temperatures. Here, too, the gray scale value is reduced by increasing the temperature during the lamination process. Since the two parameters of pressure and temperature are also correlated with the adhesive strength of the laminated electrode-separator assembly, the quality of this adhesive strength can also be assessed. It is thus possible to determine the adhesive strength directly by determining the gray scale value of the electrode-separator assembly. In this way, directly after the lamination process, a conclusion can be reached about the quality of the intermediate product in the form of the relevant inspected electrode-separator assembly without having to carry out a destructive test procedure. In addition, the device or the data processing device can be designed with an optical detection of flaws in order to control the lamination in-line, i.e. in the ongoing manufacturing process. In this way, both large-area unlaminated flaws and local foreign particles can be detected, which enables complete quality control of the electrode-separator assembly.

Figure 2:
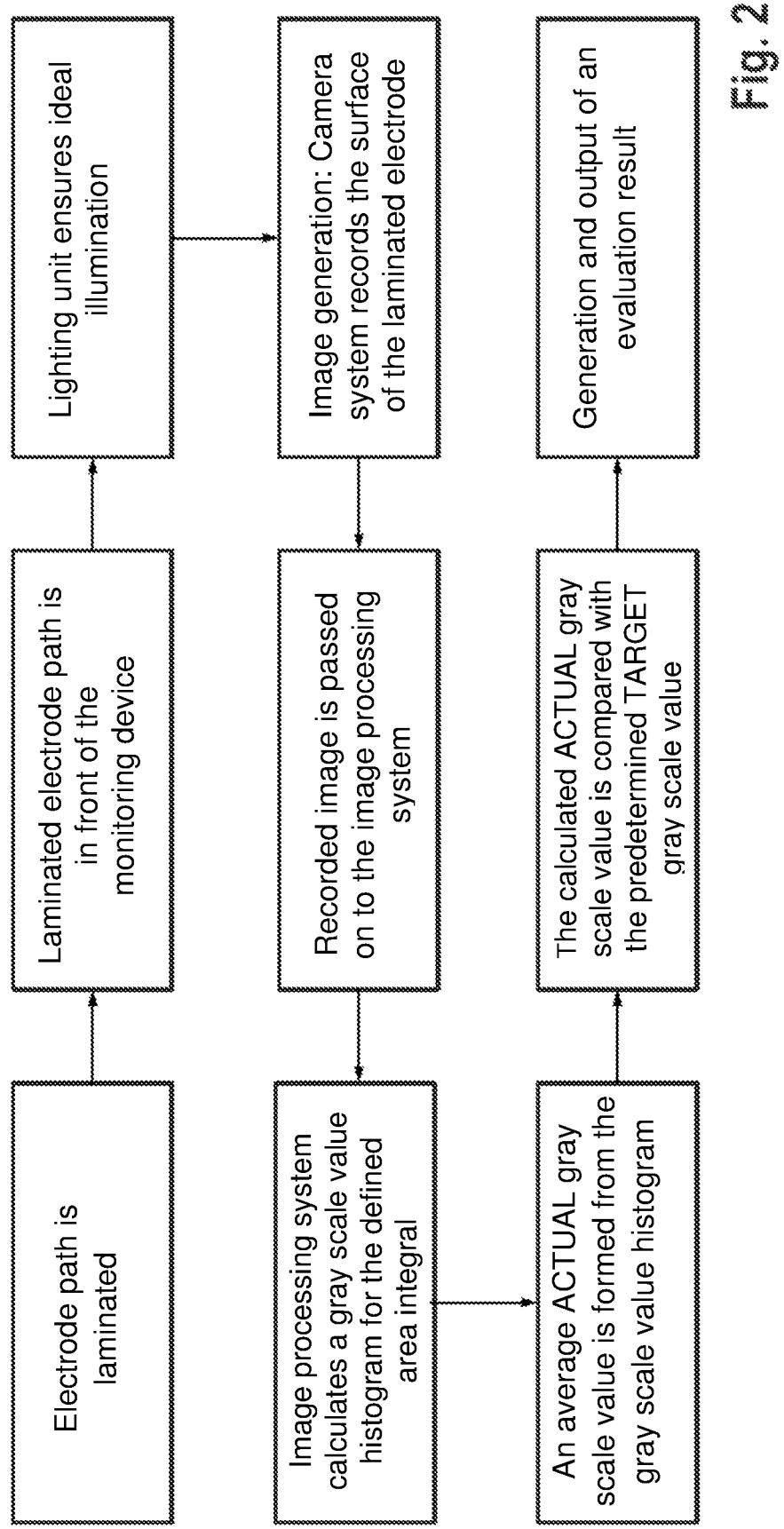
FIG. 2: is an embodiment of the proposed method from lamination to gray scale value determination.

FIG. 2 shows the steps of the method from the lamination of the electrode. Then the laminated electrode is first fed to the measuring system. Optimal illumination is provided there by a lighting system in order then to generate a measurement result with a camera system in the next step. After this, the measurement result in the form of an image for image processing is fed to a data processing device, where the ACTUAL gray scale value is determined. The image can be a color image or a gray scale image. This takes place by means of a gray scale histogram for the defined area integral. In a further step, an average ACTUAL gray scale value is formed from the gray scale histogram, and is then compared in a next step with a predetermined TARGET gray scale value. In the last step, an evaluation result is generated and output from the comparison of the ACTUAL gray scale value with the SET gray scale value. For this purpose, the output can take place in a visual, optical, haptic, acoustic or other form which is suitable for conveying the evaluation result to a human user. In a particularly simple embodiment, the evaluation result can be output as a binary value, such as good/bad, yes/no, and thus can inform the user whether or not the electrode-separator assembly meets the requirements. With another form of output of the evaluation result, this can take place in the form of signals which are intended for further processing in a data processing device.

Figure 3:
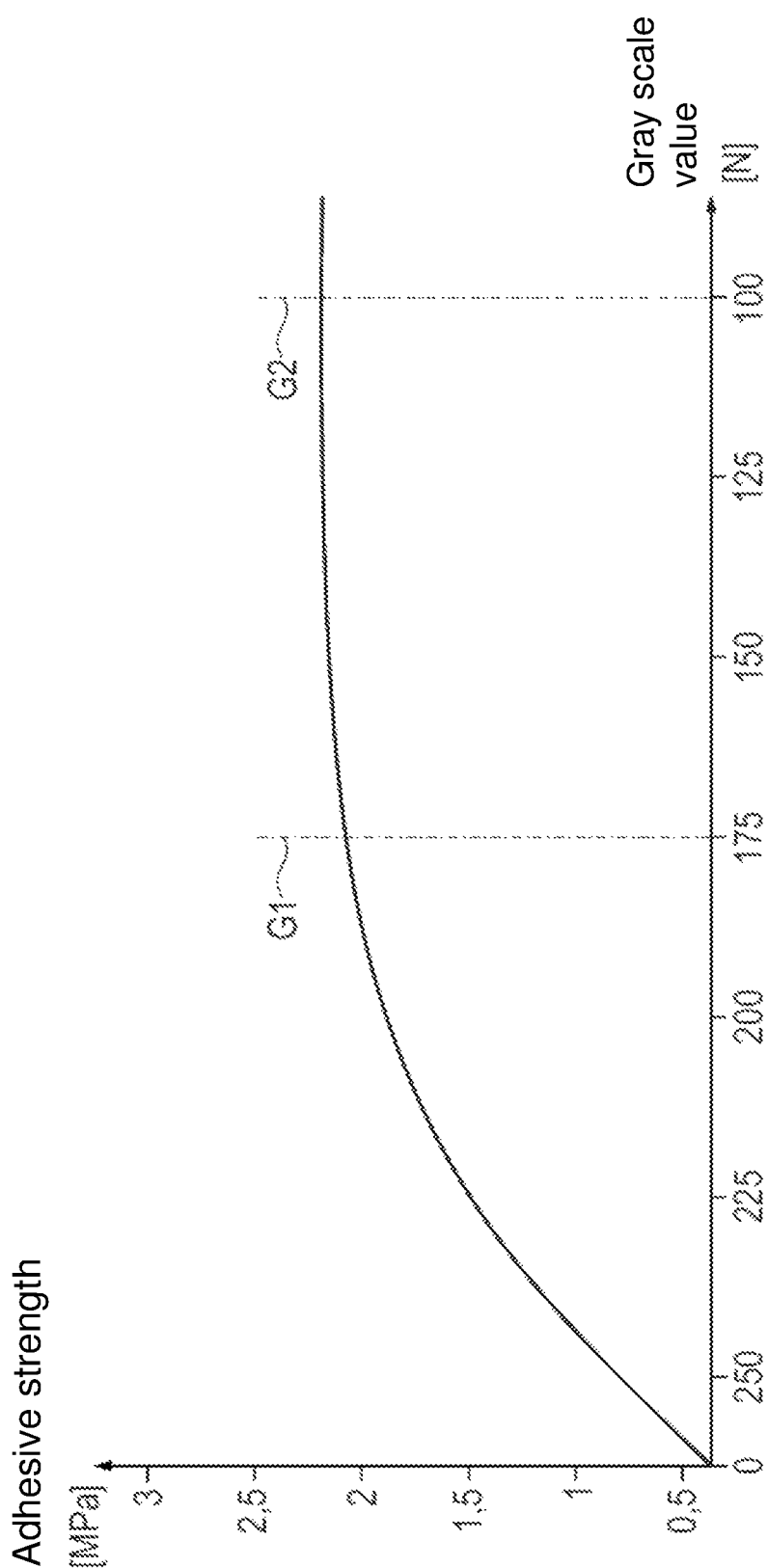
FIG. 3: is a diagram with the correlation of gray scale value and adhesive strength.

In FIG. 3, the relationship between the gray scale value and the adhesive strength between the functional layers 7 is shown qualitatively using a specific example. It can be clearly seen in this figure that from a gray scale value G1 of approximately 175 [N] the adhesive strength already reaches a very high value, reaching approximately 90% of a maximum value which the adhesive strength reaches at the gray scale value G2. Thus, for example, the value 175 can serve as a target value above which a sufficiently good connection exists between the functional layers 7. As a result, all electrode-separator assemblies 3 with a gray scale value that is greater than this target value G1 of 175 [N] and less than the target value G2 of 100 [N] can be identified as correctly manufactured parts and can be further processed. However, parts that have a gray scale value that is below this target value G1 or above the target value G2 can be identified immediately as defective parts and can be removed from the production process. Alternatively, starting from the target value G2 which corresponds to the maximum adhesive strength, a range can also be selected in which the adhesive strength is at least 80%, preferably at least 90% of the maximum adhesive strength. For this purpose, the range could be selected, for example, such that it extends from the lower target value G1 located on the left side of G2 to an upper target value G3 located on the right side of G2 (not shown in the figure). If the determined actual value of the gray scale value is in this range, it is ensured that the adhesive strength is at least 80% and preferably at least 90% of the maximum adhesive strength.

Figure 4:
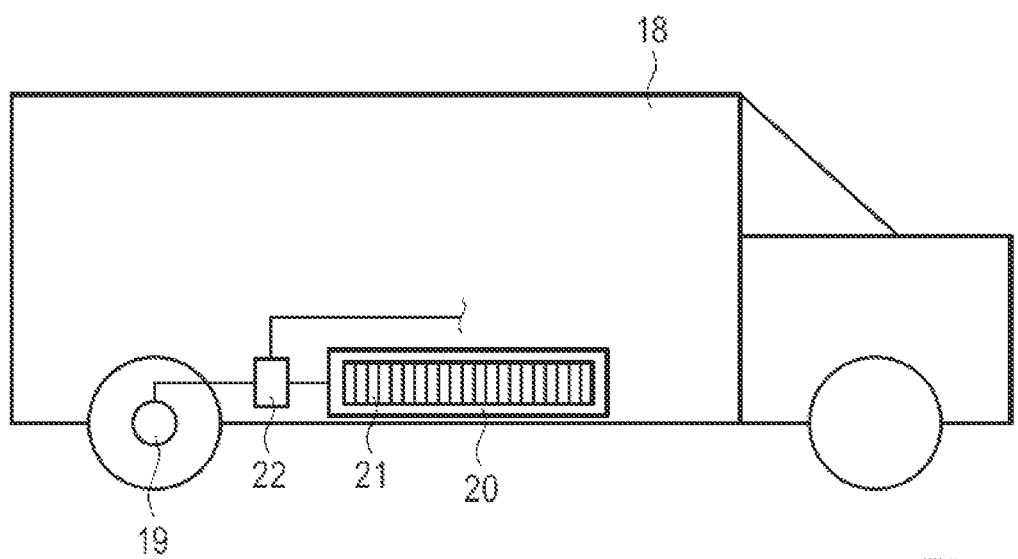
FIG. 4: shows a motor vehicle with battery cells according to the present invention.

Finally, FIG. 4 shows a motor vehicle 18 which has an electric drive. The electric drive consists of an electric motor 19 which is operated by means of electrical energy provided by a battery 20. The battery 20 in turn has a large number of battery cells 21. The energy output of the battery 20 to the electric motor 19 is controlled by means of a control device 22. The battery cells 21 arranged in the battery 20 are equipped with electrode-separator assemblies 3 according to the present invention and thus have the advantages that the functional layers 7 are connected particularly reliably, the battery 20 has improved performance and the production costs are reduced.

LIST OF REFERENCE SIGNS 1 device
2 feed device
3 electrode-separator assembly
4 electrode
5 separator layers
6 active material layers
7 functional layers
8 housing
9 lighting system
10 surface
11 camera system
12 signal line
13 electronic data processing device
14 second signal line
15 PLC control
16 third signal line
17 server
18 motor vehicle
19 electric motor
20 battery
21 battery cell
22 control device

The invention claimed is:

1. A method for inspection of a multilayer electrode-separator assembly for a battery cell, comprising at least the following steps:

a) joining together at least two functional layers;
b) connecting the functional layers to form a multilayer electrode-separator assembly;
c) detecting at least part of a surface of the electrode-separator assembly by means of a detection device for generating a measurement result;
d) evaluating the generated measurement result by:
determining an associated ACTUAL characteristic value, wherein the associated ACTUAL characteristic value is a gray scale value,
comparing the determined ACTUAL characteristic value with a predetermined TARGET characteristic value, and
determining the evaluation result by comparing the ACTUAL characteristic value and the TARGET characteristic value,
e) generating an evaluation result; and
f) outputting the evaluation result.

2. The method for inspection of an electrode-separator assembly for a battery cell according to claim 1, wherein the step of joining together comprises joining together at least one electrode with an active material layer and at least one separator layer.

3. The method for inspection of an electrode-separator assembly for a battery cell according to claim 1, wherein the functional layers are connected to one another by means of a lamination process, adhesive process or welding process.

4. The method for inspection of an electrode-separator assembly for a battery cell according to claim 1, wherein steps a) to f) are carried out one after the other in a continuous process (in-line).

5. The method for inspection of an electrode-separator assembly for a battery cell according to claim 1, wherein the step of detecting at least part of a surface of the electrode-separator assembly surface is carried out using an optical camera system.

6. The method for inspection of an electrode-separator assembly for a battery cell according to claim 1, wherein the step of evaluating the generated measurement result is carried out using an electronic data processing system configured for image processing.

7. The method for inspection of an electrode-separator assembly for a battery cell according to claim 1, wherein step c) is carried out under constant and defined lighting conditions.

8. A device with at least one detection device and means which are suitable for carrying out steps a) to e) according to claim 1.

9. A battery cell, comprising:
at least two electrodes which are separated by at least one electrode-separator assembly,
wherein a first electrode-separator assembly of a first pair of electrodes is separated from a second electrode-separator assembly of a second pair of electrodes by at least one separator layer,
wherein said at least one separator layer has an at least two-layer structure and is manufactured using the method according to claim 1.

10. The battery cell according to claim 9, wherein the battery cell is a lithium-ion cell.

* * * * *